United States Patent Office 2,961,401
Patented Nov. 22, 1960

2,961,401

THREAD COMPOSITION CONTAINING GROUND SEED SHELLS

George C. Howard and Lawrence B. Wilder, Tulsa, Okla., assignors to Pan American Petroleum Corporation, Tulsa, Okla., a corporation of Delaware No Drawing. Filed Oct. 30, 1957, Ser. No. 693,227

9 Claims. (Cl. 252—17)

This invention relates to lubricants. More particularly, it relates to thread compounds for use in pipe joints.

When threaded pipe is screw into threaded couplings, a lubricant is generally applied. This lubricant serves not only to lubricate the threads, but also to seal any small spaces remaining between the threads and, thus, improve leak resistance of the connection. Frequently, finely divided particles of malleable metals, such as copper or lead, are added to the thread compound to improve the leak resistance of joints in which the compound is used.

Even when the best thread compounds are used, leakage sometimes occurs at pressures below the safe working pressures for the pipe. This is generally due to differences between the taper, depth, or shape of the two threads which are screwed together. The problem is particularly serious in pipe with thick walls if the pipe or coupling is not exactly round, but slightly elliptical.

An object of this invention is to provide an improved thread compound. Other objects will be apparent from the following description and claims.

We have found that thread compounds can be greatly improved by the addition of ground hard seed particles. For example, ground black walnut shells may be added to a lithium base grease, or to thread compounds now available, to form improved thread compounds.

Most plant seeds have some portions which are fairly hard and strong. For our purposes, these hard strong portions should be capable of being ground to a granular form passing a Number 30 U.S. standard sieve and preferably passing a Number 100 sieve. For convenience in grinding, the hard plant seed material should have a thickness of at least about 0.04 inch. Thinner shells may be used in some cases, but generally are not desirable because of their more fibrous nature, which increases the difficulty of grinding, and because the thinner shells are softer and weaker and many of them tend to soften further upon contact with water or oil. To exclude such soft materials, a minimum limitation of about 5,000 pounds per square inch should be observed in the compressive strength of the hard plant seed materials.

Preferred hard plant seed materials include shells from black walnuts, English walnuts, hickory nuts, butternuts, pecans, coconuts, and Brazil nuts. The preferred hard plant seed materials also include pits from peaches, apricots, cherries, olives, and dates. Other similar hard plant seed materials generally referred to in the industry as "shell" will occur to those skilled in the art. Some of the thinner, more fibrous shells can be made to work. These include almond shells, chestnut shells, acorn shells, cottonseed hulls, and the like. This group of thinner shells should be regarded as operable but relatively undesirable alternates to the thicker shells. Other seeds, such as grape seeds, orange seeds, watermelon seeds, peanut hulls, and the like, should not be considered operable. The hard portions of such seeds are too thin, soft, and water sensitive. When reference is made hereinafter to "finely divided hard plant seed material" it will be understood that reference may be to a single type of material, such as black walnut shells or peach pits, or may be to a mixture of several types of such hard plant seed materials. Of the shell materials described above, the ones preferred over all the others are black walnut shells and peach pits. These are preferred because they are among the hardest and strongest, are the most readily available in large amounts, and are obtainable at a low cost.

The type of grease to which the finely ground shell is added apparently is not of great importance. If the threads are to be exposed to water, use of water-soluble soaps, such as sodium stearate, in the grease should, of course, be avoided. By far the most preferred type of grease is a lithium grease containing about 5 to 10 percent of a lithium soap of a fatty acid, such as stearic acid, in a mineral oil having a viscosity of from about 200 to about 800 seconds as measured by the Saybolt Universal viscosimeter in accordance with ASTM Test D88–53. Other suitable lithium greases, together with several satisfactory methods of preparing them, are described in an article entitled "Lithium Greases" in The Petroleum Engineer, May 1953, page C–15. The grease may consist simply of a mineral oil and a suitable soap, or it may contain other additives, such as the finely divided lead, copper, graphite, and the like frequently used in thread compounds. Other greases, such as very viscous petroleum fractions free from soaps, may also be used as bases for our thread compounds.

The concentration of finely divided hard plant seed materials, such as black walnut shells, should be between about 10 percent and about 50 percent by weight of the total thread compound; that is, the thread compound should contain between about 50 and about 90 percent grease and between about 50 and about 10 percent finely divided shell materials.

Mixing of the ground hard plant seed material into the grease may take place by any convenient means. Preferably, the finely divided shell material should be blended into the grease by mixing or milling while the grease is cold. It may, however, be mixed into the grease at elevated temperatures, such as those normally used in grease manufacture. Stirring must, of course, continue in such cases until the viscosity of the composition is sufficient to prevent settling of the solid particles of shell materials.

A preferred thread compound can be prepared by stirring about 30 parts by weight of black walnut shells ground to pass a Number 100 U.S. standard sieve into about 70 parts of a lithium grease containing about 8 percent lithium stearate and about 92 percent of a mineral oil having a viscosity of about 300 seconds at 100° F. on the Saybolt Universal viscosimeter.

Our invention will be better understood from the following example in which several thread compounds were tested on threads of pipes of various diameters. Each test assembly consisted of a 2-foot length of pipe with a coupling and bull plug at each end. One plug was tapped to permit application of hydraulic pressure inside the assembly. Reference marks were made with a center punch on the bull plugs and pipe section. The threads were cleaned thoroughly, coated generously with the thread compound, and all threads made up by hand. The pipe was then placed in a lathe, chain tongs were applied to the bull plug, and the pipe was turned by the lathe until the weight of the chain tongs would not prevent turning of the bull plug. The distances from the reference marks to the edges of the couplings were then measured. A weight was next hung on the end of the 10-foot handle of the chain tongs, the pipe was again turned by the lathe until the tongs and added weight would not prevent turning of the bull plug, and the distances from the marks to the edges of the coupling were again measured. The same procedure was repeated with the bull plug on the other end of the assembly. The number of turns make up by application of the known amount of torque was calculated from the difference in the distances to the reference marks with and without the weight hung on the end or the chain tongs handle. Hydraulic pressure was then applied to the interior of the pipe assembly in increments of about 1,000 p.s.i. until a joint leaked. If no leak occurred at approximately the safe working pressure of the pipe, this fact was noted. In some cases when a leak developed at a pressure considerably below maximum working pressure, the joints were disassembled, cleaned, new thread compound was applied, and the joints were made up with increased torque. The pressure at which leakage occurred was then again measured. The results of these tests are presented in the following table.

Table

| Pipe | | | Thread Compound | Make Up Torque, ft. lb. | Threads Make Up | Leak Pressure, lb./sq. in. |
|---|---|---|---|---|---|---|
| O.D., inches | Weight, lb. | Grade | | | | |
| 7 | 26 | N-80 | Ordinary thread compound. | 5,130 | 3.40 | 4,000 |
| 7 | 26 | N-80 | Nutshells in ordinary thread compound. | 5,130 | 3.50 | 7,200 |
| 7 | 26 | N-80 | Nutshells in lithium grease. | 5,130 | 3.50 | 7,200 |
| 5½ | 17 | J-55 | Ordinary thread compound. | 1,645 | 1.24 | 5,500 |
| 5½ | 17 | J-55 | Ordinary thread compound. | 2,140 | 1.76 | ¹ NL5,500 |
| 5½ | 17 | J-55 | Lithium grease | 490 | 0.60 | 500 |
| 5½ | 17 | J-55 | Lithium grease | 1,125 | 0.82 | 1,000 |
| 5½ | 17 | J-55 | Lithium grease | 1,645 | 1.18 | 3,000 |
| 5½ | 17 | J-55 | Nutshells in lithium grease. | 490 | 0.90 | 5,500 |
| 5½ | 17 | J-55 | Nutshells in lithium grease. | 1,125 | 1.42 | ¹ NL5,500 |

¹ NL means no leak occurred at the designated pressure.

The ordinary thread compound was a lithium base grease containing about 40 percent by weight of a mixture of copper, zinc, and lead powders. This composition was selected for comparison since it had proved superior to other thread compounds in previous tests. The lithium grease was a standard auto chassis lubricant. The nutshells in all cases were black walnut shells ground to pass a Number 100 U.S. standard sieve. One part of walnut shell flour and two parts of lithium grease were used to prepare the nutshells in lithium grease composition listed in the table. Only one part of walnut shell flour was used with five parts of the ordinary thread compound since this compound was already rather thick and viscous because of the metal powders present.

The results persented in the table show that ordinary grease containing finely divided hard plant seed material performs better than regular thread compounds containing metal powders. The results also demonstrate that ordinary thread compounds can be greatly improved by adding a little of the finely ground hard plant seed material. Thus, it will be apparent that we have accomplished the objects of our invention.

We claim:

1. A thread composition consisting essentially of from about 50 to about 90 percent by weight of grease containing a mineral lubricating oil gelled with a metal soap, and from about 10 to about 50 percent by weight of a finely divided hard plant seed material having a compressive strength of at least about 5,000 pounds per square inch.

2. The thread composition of claim 1 in which said grease is a lithium base grease.

3. The thread composition of claim 1 in which said finely divided hard plant seed material is black walnut shells ground to pass a Number 100 U.S. standard sieve.

4. The thread composition of claim 3 in which said grease is a lithium base grease.

5. The method of increasing the pressure which a threaded pipe joint will withstand without leaking comprising applying to the threads of said joint before screwing together a thread composition consisting essentially of from about 50 to about 90 percent by weight of grease containing a mineral lubricating oil gelled with a metal soap and from about 10 to about 50 percent by weight of a finely divided hard plant seed material having a compresssive strength of at least about 5,000 pounds per square inch and subsequently screwing said threads together to form the joint.

6. The method of claim 5 in which said grease is a lithium base grease.

7. The method of claim 5 in which said finely divided hard plant seed material is black walnut shells ground to pass a Number 100 U.S. standard sieve.

8. The method of claim 7 in which said grease is a lithium base grease.

9. A pipe thread composition consisting essentially of about 85% to 90% by weight of a lubricating grease containing a mineral lubricating oil gelled with a metal soap and about 10% to about 15% by weight of walnut shells ground to pass a Number 100 U.S. standard sieve.

References Cited in the file of this patent

UNITED STATES PATENTS

| 2,779,735 | Brown et al. | Jan. 29, 1957 |
| 2,800,964 | Garrick | July 30, 1957 |
| 2,811,207 | Clark | Oct. 29, 1957 |
| 2,815,079 | Goins et al. | Dec. 3, 1957 |

OTHER REFERENCES

"Lubricating Grease" by Boner-Reinhold Pub. Co., New York, N.Y., (1954), page 784.